United States Patent
Eastham et al.

(10) Patent No.: US 8,533,255 B2
(45) Date of Patent: Sep. 10, 2013

(54) SYSTEMS AND METHODS FOR HANDLING FAILOVER IN A DISTRIBUTED ROUTING ENVIRONMENT

(75) Inventors: Bryant Eastham, Draper, UT (US); Tom Milligan, South Jordan, UT (US)

(73) Assignee: Panasonic Corporation, Osaka (JP)

( * ) Notice: Subject to any disclaimer, the term of this patent is extended or adjusted under 35 U.S.C. 154(b) by 885 days.

(21) Appl. No.: 11/302,306

(22) Filed: Dec. 13, 2005

(65) Prior Publication Data

US 2007/0135941 A1    Jun. 14, 2007

(51) Int. Cl.
*G06F 15/16* (2006.01)
*H04L 1/00* (2006.01)

(52) U.S. Cl.
USPC ........... 709/203; 370/216; 370/217; 370/221; 370/225

(58) Field of Classification Search
USPC ................. 709/203, 224; 370/216, 217, 221, 370/225
See application file for complete search history.

(56) References Cited

U.S. PATENT DOCUMENTS

| | | | |
|---|---|---|---|
| 5,455,865 A | 10/1995 | Perlman | |
| 5,483,652 A * | 1/1996 | Sudama et al. | 709/201 |
| 6,031,817 A * | 2/2000 | Moy | 370/216 |
| 6,594,235 B1 | 7/2003 | Rochberger et al. | |
| 6,671,819 B1 | 12/2003 | Passman et al. | |
| 7,068,595 B2 | 6/2006 | Perlman et al. | |
| 7,089,311 B2 | 8/2006 | Devine et al. | |
| 2002/0178254 A1 * | 11/2002 | Brittenham et al. | 709/224 |
| 2005/0163061 A1 * | 7/2005 | Piercey et al. | 370/255 |
| 2005/0278542 A1 * | 12/2005 | Pierson et al. | 713/182 |

* cited by examiner

*Primary Examiner* — Boris Gorney
(74) *Attorney, Agent, or Firm* — Austin Rapp & Hardman

(57) ABSTRACT

A computing device configured to implement a method for binding negotiation is disclosed. The computing device includes a processor and memory in electronic communication with the processor. A first binding has a first binding ID. Instructions are stored in the memory to implement a method for binding negotiation. The first binding is advertised on a network. A second provider is discovered to also provide the first binding with a second binding ID on the network. The computing device then determines whether it is to provide the first binding by evaluating a collision function (F). Based on the result of the collision function, either the addition of the first binding with the second binding ID is halted, or the first binding with the first binding ID is canceled.

17 Claims, 11 Drawing Sheets

SYSTEMS AND METHODS FOR HANDLING FAILOVER IN A DISTRIBUTED ROUTING ENVIRONMENT

TECHNICAL FIELD

The present invention relates generally to computers and computer-related technology. More specifically, the present invention relates to systems and methods for handling failover in a distributed routing environment.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc.

Some embedded systems may provide data and/or services to other computing devices using a computer network. Alternatively there may be typical computers or computing devices that provide data and/or services to other computing devices using a computer network. There may be a number of providers on the network. Sometimes providers may fail, which in turn means that the data and/or services being provided by the provider might also fail. Benefits may be realized if systems and methods were provided to handle failover in computer networks.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
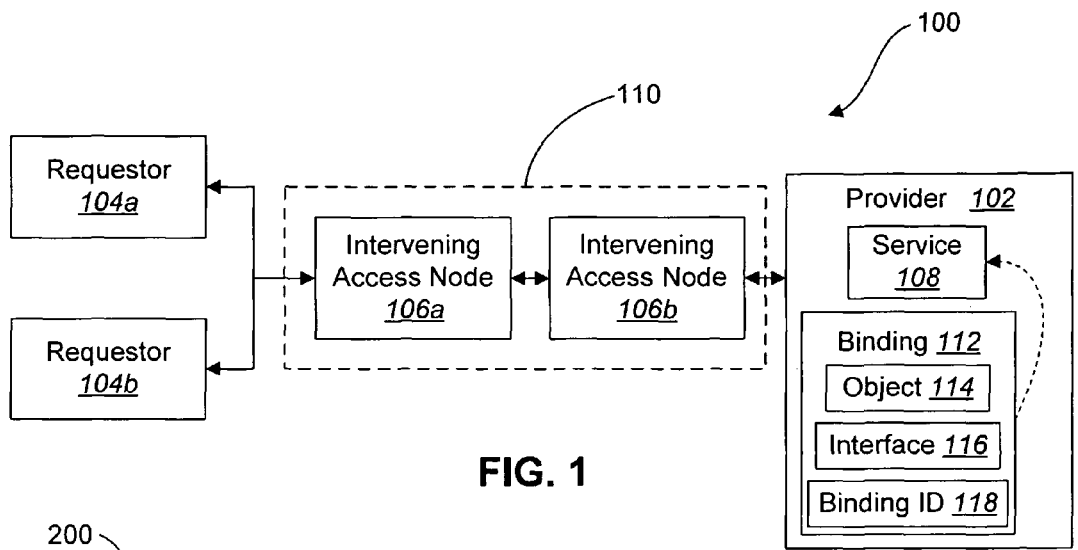
FIG. 1 is a network block diagram illustrating two intervening access nodes in a computer network.

A computing device configured to implement a method for binding negotiation is disclosed. The computing device includes a processor and memory in electronic communication with the processor. A first binding has a first binding ID. Instructions are stored in the memory to implement a method for binding negotiation. The first binding is advertised on a network. A second provider is discovered to also provide the first binding with a second binding ID on the network. The computing device then determines whether it is to provide the first binding by evaluating a collision function (F). Based on the result of the collision function, either the addition of the first binding with the second binding ID is halted, or the first binding with the first binding ID is canceled.

The first binding may include an object and an interface. A service may be accessed through use of the object and the interface.

In some embodiments the collision function uses the first binding ID and the second binding ID as inputs and provides a Boolean result. Furthermore, the collision function (F) may satisfy the condition that F(A, B) is not the same as F(B, A), such that (F) satisfies the condition that if F(A, B)=True, then F(B, A)=False. In certain embodiments the collision function (F) comprises a less than function.

The instructions may implement a second method. A removal attempt is received from the network. The removal attempt is attempting to remove a second binding on a network. It is determined whether the computing device has the ability to provide the second binding. The removal attempt is allowed to continue if the computing device is not capable of providing the second binding. The removal attempt is halted, and the second binding is added to the network if the computing device is capable of providing the second binding but is not currently providing the second binding. In some embodiments the computing device is configured to implement a three-phase commit method.

The computing device may be embodied in various systems. For example, the computing device may be an embedded device that is part of a lighting control system. The computing device may be an embedded device that is part of a security system. Furthermore, the computing device may be an embedded device that is part of a home control system.

A method for binding negotiation between two or more providers is also disclosed. A first binding has a first binding ID. The first binding is advertised on a network by a first provider. A second provider is discovered to also provide the first binding with a second binding ID on the network. The first provider then determines whether it is to provide the first binding by evaluating a collision function (F). Based on the result of the collision function, either the addition of the first binding with the second binding ID is halted, or the first binding with the first binding ID is canceled.

A computer-readable medium comprising executable instructions for implementing a method for binding negotiation between two or more providers is also disclosed. A first binding has a first binding ID. The first binding is advertised on a network by a first provider. A second provider is discovered to also provide the first binding with a second binding ID on the network. The first provider then determines whether it is to provide the first binding by evaluating a collision function (F). Based on the result of the collision function, either the addition of the first binding with the second binding ID is halted, or the first binding with the first binding ID is canceled.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

In distributed networks there are often failures in the underlying networks that connect the system together. Typical networks solve this problem by identifying alternate routes, and switching to those routes when a failure is encountered. In addition to the failure of network components, the ultimate providers of information can also fail. In typical networks this problem is solved by having multiple "redundant" providers and using failover to switch requests between them. These two solutions usually operate on different scales—network link failures occur in the WAN environment, and failover happens in a LAN, with a dedicated piece of hardware monitoring the different systems and switching.

The present systems and methods provide the ability of have a plurality of providers of the same binding, where only one of them is actually routable at a time. The others are not active, but can become active and visible if the currently routable provider fails for any reason.

This allows for high-availability of services (providers) in a distributed system. It is also not a requirement that all potential providers be closely coupled, as is the case in many systems today.

The system includes a set of nodes that are connected in an arbitrary fashion. This set of connections can contain loops, but there is at least one route from each node to each other node. Connected to this network are requesters and providers. These may exist on separate nodes that are connected to a single node in the network, or they may run on the network node itself.

Providers add binding information into the network. Each binding is assigned a unique identifier, and may also include an object identifier and an interface identifier. Partial duplicates (meaning the object identifier and interface identifier) are allowed, but the unique identifier for the binding cannot be duplicated by another binding.

This information is propagated through the network using a distributed three-phase commit (described below). This gives any node in the network the ability to "halt" the propagation indefinitely. This same procedure is used when a link is broken and the network needs to determine a new route and also when a binding is removed from the system.

FIG. 1 is a network block diagram illustrating two intervening access nodes in the network 100. A provider 102 is in electronic communication with the network 100. The network embodiment 100 of FIG. 1 includes two requesters 104 in electronic communication with the network 100. The intervening access nodes 106 are also on the network 100. There may be more nodes on the network 100.

An intervening access node 106 is a network node that provides features and services to the network 100. An intervening access node 106 may be used in a variety of ways. For example, an intervening access node 106 may be present on a network to provide services to computers, applications and/or objects on the network 100. An intervening access node 106 may also be used to provide a protocol converter. An intervening access node 106 may be embedded or it 106 may be large enough to handle enterprise traffic.

One feature that an intervening access node 106 may include relates to object refinement. Object refinement refers to the situation where an intervening access node 106 places itself in place of an object and provides different implementations of the same interfaces. This allows, among other things, for problems in the implementation of an interface to be fixed without changing the actual end provider of the interface.

An additional feature of an intervening access node 106 is that of object augmentation. Object augmentation is where the intervening access node 106 adds new interfaces to an object that the end provider does not support.

In current design, the intervening access node 106 does not differentiate between clients and devices, so any service added is available to any (authorized) connected entity or node.

The network 100 as shown in FIG. 1 may inherit many features of web services. Web services are accessed using web protocols, usually HTTP and SOAP. The architecture is based on the peer-to-peer paradigm of networking.

Multiple intervening access nodes 106 in communication with one another form an intervening access node network 110. To requesters 104 and/or providers 102, the one or more intervening access nodes 106 of the intervening access node network 110 appear as a single intervening access node 106. The size or number included in the intervening access node network 110 is transparent to providers 102 and/or requestors 104.

A provider 102 is a node on the network 100 that is the source of a service 108. A requester 104 is a node on the network 100 that is the user of the service 108. A requestor 104 is a software entity implemented on a node that may directly discover a service 108 to control or interact with it.

The service 108 may be any kind of service that may be provided by a computing device. Some possible examples of services 108 include providing temperature data from a location, providing surveillance data, providing weather information, providing an audio stream, providing a video stream, etc. Many different kinds of services and/or data may be provided over a computer network 100 from a provider 102.

The service 108 is accessed through one or more bindings 112. A binding 112 includes an object identifier 114 and an interface identifier 116. Typically the object 114 and the interface 116 are in pairs. A provider 102 can provide a plurality of bindings 112. It is possible that multiple providers 102 can be providing the same service 108, binding 112, object 114 or interface 116. Each binding 112 can be represented with a unique binding ID 118. The binding ID 118 must be unique to the intervening access node network 110.

The provider 102 may be an embedded provider. An embedded provider is a provider 102 being implemented on an embedded device. An embedded device is a type of computing device that does not include all the same components associated with a typical desktop computer. For example, some embedded devices do not include monitors, others do not include a keyboard or a mouse, and some embedded devices do not include either a monitor or a keyboard/mouse. Many embedded devices are microcontroller-based devices, i.e., the central processor for the embedded device is a microcontroller.

The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
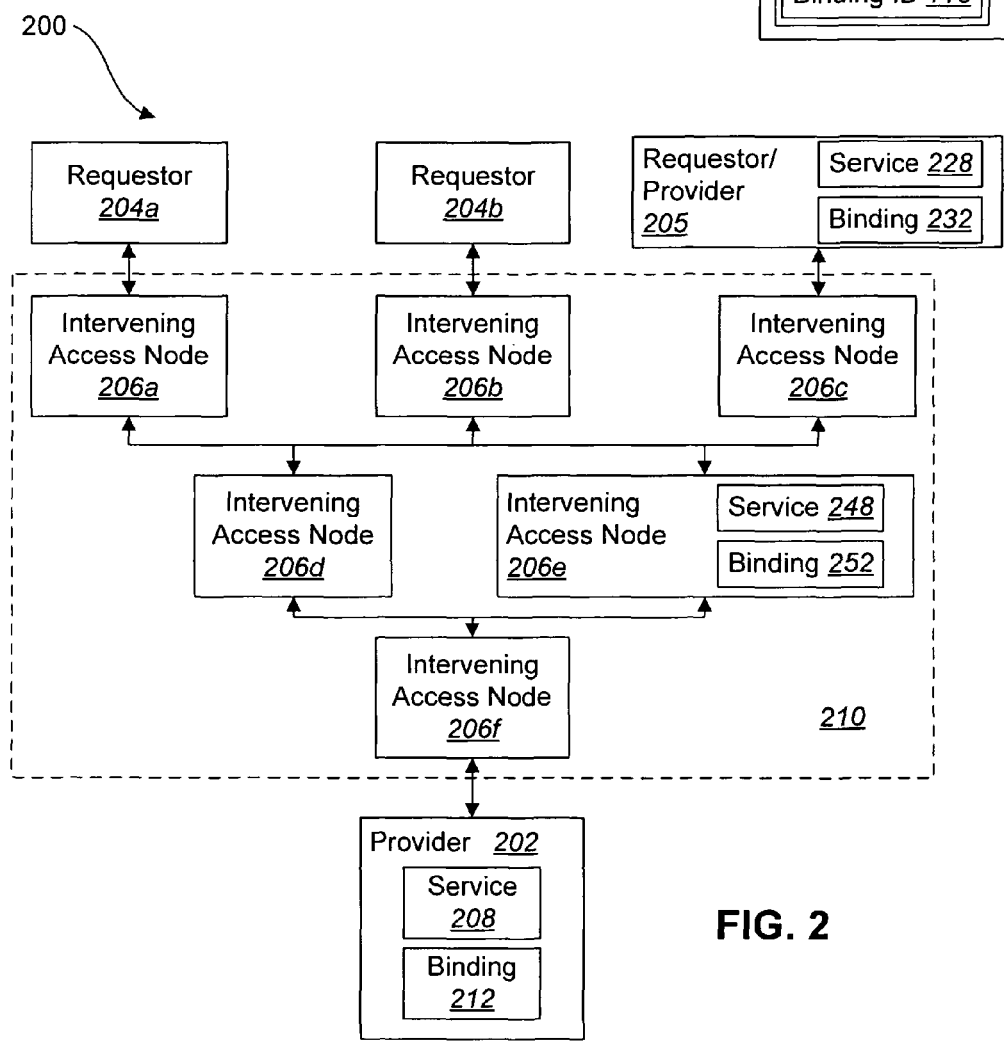
FIG. 2 is a network block diagram illustrating several intervening access nodes in a computer network.

Any number of intervening access nodes 106 may be used in a network 100. FIG. 2 illustrates a network 200 that includes a number of intervening access nodes 206 as shown. Two requesters 204 are in electronic communication with the intervening access nodes 206. In addition, a requestor/provider 205 is in electronic communication with the intervening access nodes 206. In the network embodiment 200 shown in FIG. 2, the two requesters 204 all request the services 208 being provided by the provider 202. The data from the services 208 is sent through the intervening access node network 210.

The intervening access node network 210 of FIG. 2 operates similarly to the intervening access node network 110 of FIG. 1. In typical operation, the requesters 104, 204 and the providers 102, 202, including the requestor/provider 205, would not distinguish between the intervening access node network 110 of FIG. 1 and the intervening access node network 210 of FIG. 2. FIG. 2 also illustrates that a node may serve as both a requestor and a provider, as shown by the illustrated requestor/provider 205. This requestor/provider 205 provides a service 228 and binding 232. FIG. 2 also illustrates that a service/binding may be provided by an intervening access node 206*e*.

The intervening access nodes 106, 206 may be connected in an arbitrary way, which includes loops. In FIGS. 1 and 2 requesters 104, 204, 205 and providers 102, 202, 205, 206*e* were illustrated. Requestors and providers may be separate nodes or may coexist on an intervening access node.

Figure 3:
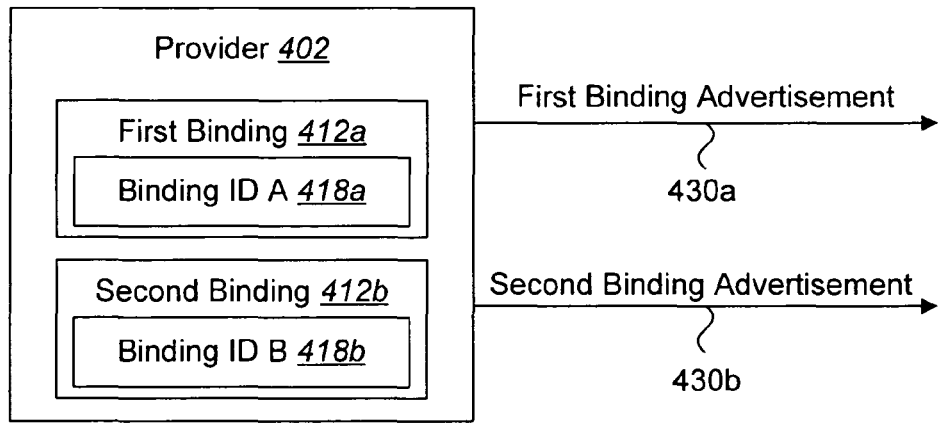
FIG. 3 is a block diagram of a provider with two bindings.

FIG. 3 is a block diagram of a provider 402 with two bindings 412*a*, 412*b*. When the provider 402 connects to an intervening access node network 110, it advertises its bindings 412*a*, 412*b* by sending out a first binding advertisement 430*a* and a second binding advertisement 430*b*. The first binding advertisement 430*a* notifies whoever receives this signal that the first binding 412*a* is available and its specific binding ID 418*a*. The second binding advertisement 430*b* notifies whoever receives this signal that the second binding 412*b* is available and its specific binding ID 418*b*. With this information requestors can request the binding 412*a*, 412*b* from the provider 402. It is also possible that the first intervening access node 106, 206 assigns and keeps track of the binding ID 418. This is possible because the provider 402 only needs the object 114 and interface 116, while the intervening access node requires the unique binding ID 418.

Figure 4:
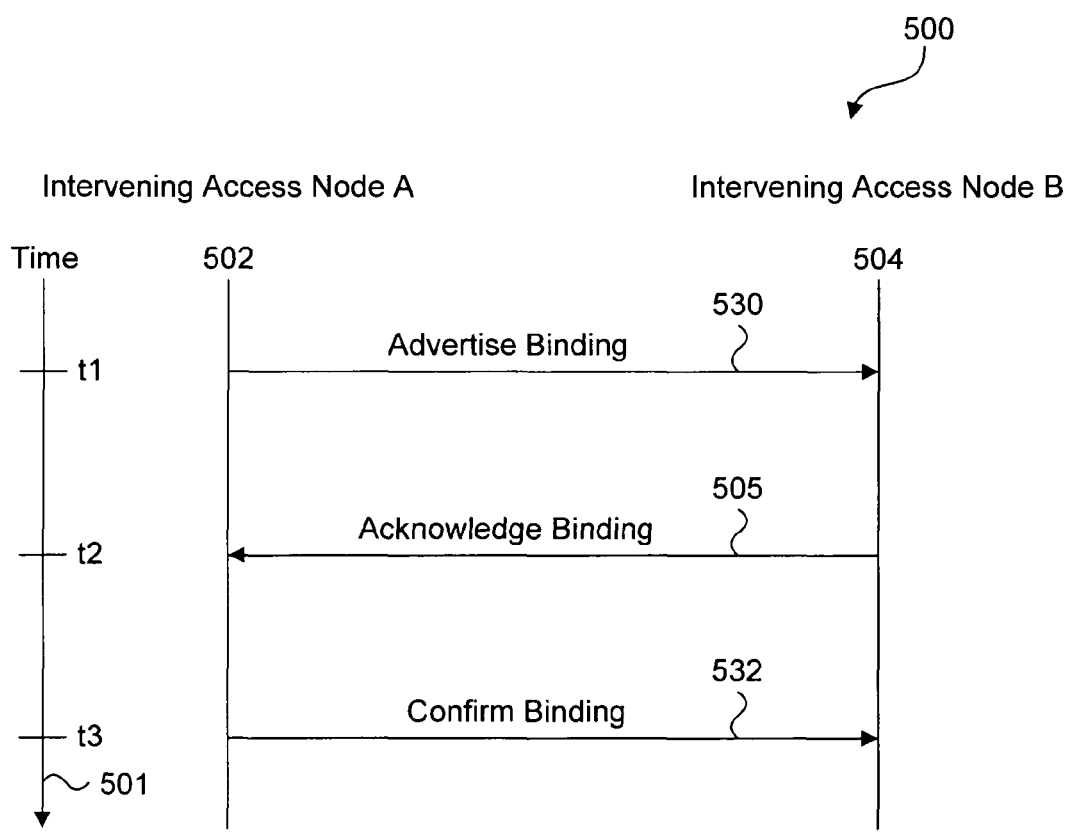
FIG. 4 is a timing diagram illustrating a three-phase commit process.

FIG. 4 is a timing diagram 500 illustrating a three-phase commit process. The time axis 501 is shown. The intervening access node A 502 has a binding to add into the network 100. At some point after connecting to the network 100, at time t1, the intervening access node A 502 advertises 530 the binding. This advertisement 530 reaches another intervening access node, intervening access node B 504. The intervening access node B 504 may then acknowledge 505 the binding at time t2. At this point the intervening access node A 502 is still not a potential provider for the intervening access node B 504. In order to lock the intervening access node A 502 into providing the other intervening access node B 504 with the service or binding, the intervening access node A 502 needs to confirm 532 the binding with the intervening access node B 504, shown at time t3. At this point, after the confirmation 532, the three-phase commit process has been gone through and the intervening access node A 502 has committed to provide the service to the intervening access node B 504. Once confirmed, the intervening access node B 504 may advertise the binding to any connected requestors 104. Note that this final advertise does not need to use the three-phase commit process.

Figure 5:
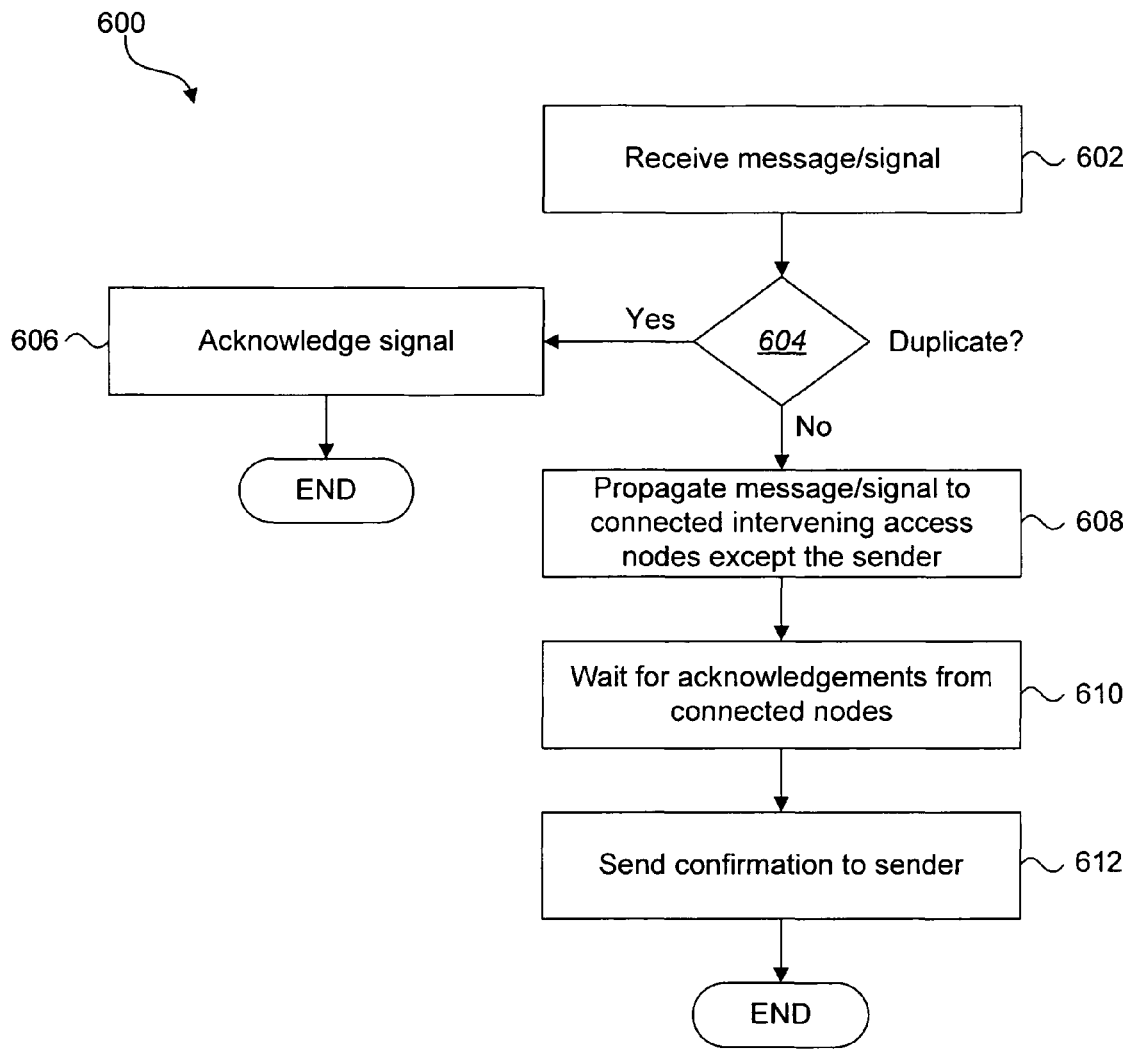
FIG. 5 is a flow diagram illustrating a method for signal or message propagation by an intervening access node.

FIG. 5 is a flow diagram illustrating a method 600 for signal or message propagation by an intervening access node 106. Messages or signals such as the advertisement 430*a* may be processed according to the method 600 shown. A message or signal is received 602. Then it is determined 604 whether the message/signal is a duplicate by checking the unique binding ID 418 of the signal or message. If the signal is a duplicate, then the node acknowledges 606 the signal immediately.

If the signal/message is not a duplicate, then the signal/message is propagated 608 to all intervening access nodes 106 that are connected to the present node except for the node that sent the present node the signal. Then the node waits 610 for acknowledgement from the connected nodes that it sent the signal to. When the acknowledgements are received and/or when a timeout is reached, a confirmation is sent 612 to all connected intervening access nodes 106. Note that this confirmation is initiated only by the original sender of the signal. It is, however, forwarded by all intervening access nodes 106.

The method 600 as outlined in FIG. 5 results in optimal behavior for intervening nodes 106 that may contain loops. Providers that are directly connected (coexist) on an intermediate node can use the same logic with very low overhead.

A problem may exist when multiple providers connect to the network and are providing the same binding. It is assumed in the present embodiments that it is desirable to only have one of the providers actually provide the binding, while additional providers with the same binding are held in reserve by the network and will be able to provide the binding in the future should the need arise. The three-phase commit is used in order to negotiate which of the providers will actually provide the binding. It is assumed that each provider has equal right and ability to provide the binding, and so any means of determining which should actually provide it is acceptable.

Figure 6:
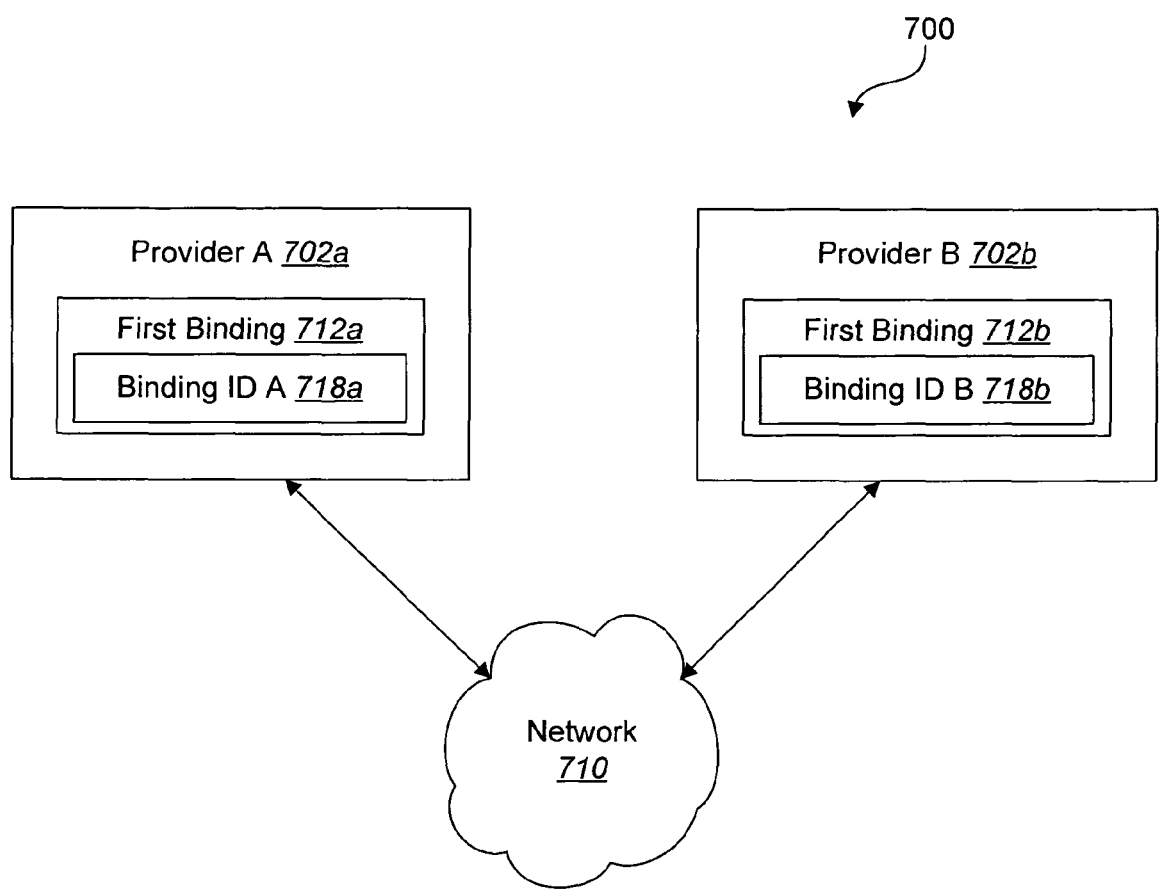
FIG. 6 is a block diagram of a network that includes one or more intervening access nodes and two providers.

FIG. 6 is a block diagram 700 of a network 710 that includes one or more intervening access nodes and two providers 702*a*, 702*b*. Provider A 702*a* includes a first binding 712a with a binding ID A 718a. Provider B 702b includes a first binding 712b with a binding ID B 718b. Thus both providers can provide the same binding, the first binding, although they have different binding identifications 718a, 718b. The network 710 and the providers 702a, 702b need to negotiate and determine which provider 702 will provide the binding and which one will be held in reserve to provide the binding at a later time, if necessary. This situation typically occurs when two or more providers 702 connect to a network 710 at approximately the same time such that each of the providers does not become aware of the other provider until after they have already advertised their bindings.

Figure 7:
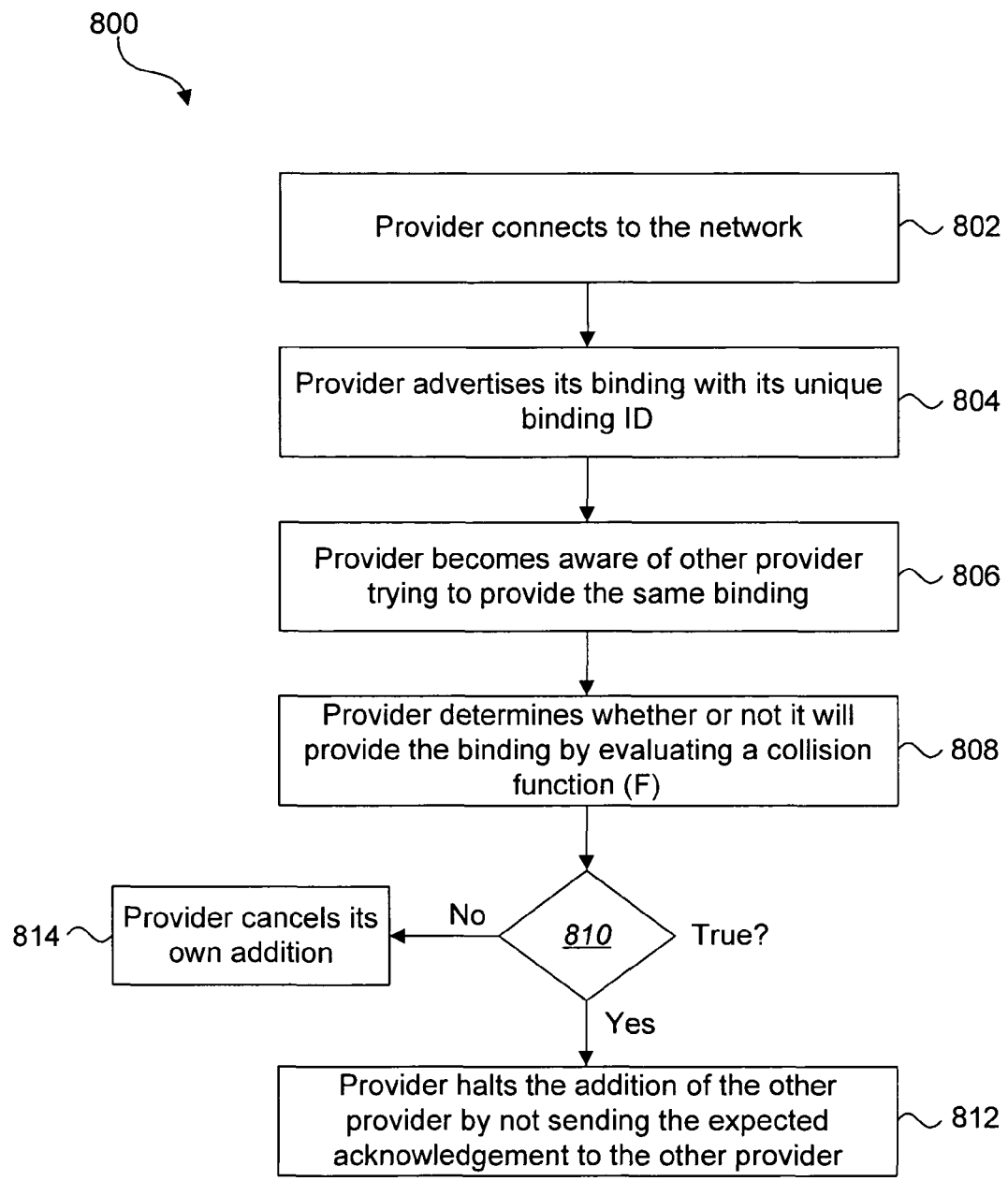
FIG. 7 is a flow diagram illustrating one embodiment of a method for determining which provider will provide the binding.

FIG. 7 is a flow diagram illustrating one embodiment of a method 800 for determining which provider 702 will provide the binding 712 in the situation as illustrated in FIG. 6. The flow diagram 800 will be explained with respect to provider A 702a for the sake of explanation. However, it will be appreciated that this same method is followed in the present embodiment by provider B 702b as well. Provider A 702a connects 802 to the network 710. Then provider A 702a advertises 804 its first binding 712a with its unique binding ID 718a. At approximately the same time provider B 702b connects to the network 710 and advertises its first binding 712b with its unique binding ID 718b. Both providers have begun the distributed three-phase commit process.

During the process of the distributed three-phase commit, provider A 702a becomes aware 806 of provider B 702b and specifically becomes aware that provider B 702b is trying to provide the same first binding 712. Provider A 702a may become aware of this, by way of example, when it receives the advertisement from provider B 702b. Provider A 702a then determines 808 whether or not it will provide the first binding 712a. This is achieved by evaluating a collision function (F) that takes as input (1) the binding ID 718a of provider A 702a and (2) the binding ID 718b of provider B 702b. If the result 810 is true, then provider A 702a halts 812 the addition of provider B 702b by not sending the expected acknowledgement to provider B 702b. If the result is false, then provider A 702a cancels 814 its own addition. Provider A 702a may cancel its own addition in a number of ways including, but not limited to, sending out a cancellation message or by simply not confirming any bindings and thus not completing the three-phase commit with any other nodes.

Once this method 800 has been accomplished by the providers 702a, 702b, only a single binding will be active. The alternate provider (the provider with the binding being held in reserve) remains present. If the current provider removes the binding for any reason, these "alternate" providers "halt" the removal while they add the same binding (using the process described above), and then they allow the removal to continue. This allows for failover from one provider to another. This process is described below in relation to FIG. 8.

In the disclosed embodiments, the collision function (F) satisfies the following conditions: (1) F results in a Boolean (true/false) result, and (2) F(G1,G2) is the opposite of F(G2, G1). The first condition simply means that when F is evaluated it will provide either a true or false result. The second condition means that the collision function will not give the same result if the parameters are the same but in a different order. For example, F(G1,G2)=F(G1, G2), but F(G1,G2) gives the opposite result as F(G2,G1). With these conditions it is important that any provider consistently place its own binding ID (e.g., G1) first in the parameters for the collision function. Alternatively, any provider may consistently place its own binding ID (e.g., G1) second in the parameters for the collision function. Because the order of the parameters is important, the providers need to consistently apply the same rules when passing parameters to the collision function. One example of F would be a "less than" comparison. If the binding ID 718a were 6,000, and the binding ID 718b were 10,000, and if F were a less than comparison, then F(6,000, 10,000) would provide a true result because 6,000<10,000. In addition, F(10,000, 6,000) would yield a false result because 10,000 is not less than 6,000.

Figure 8:
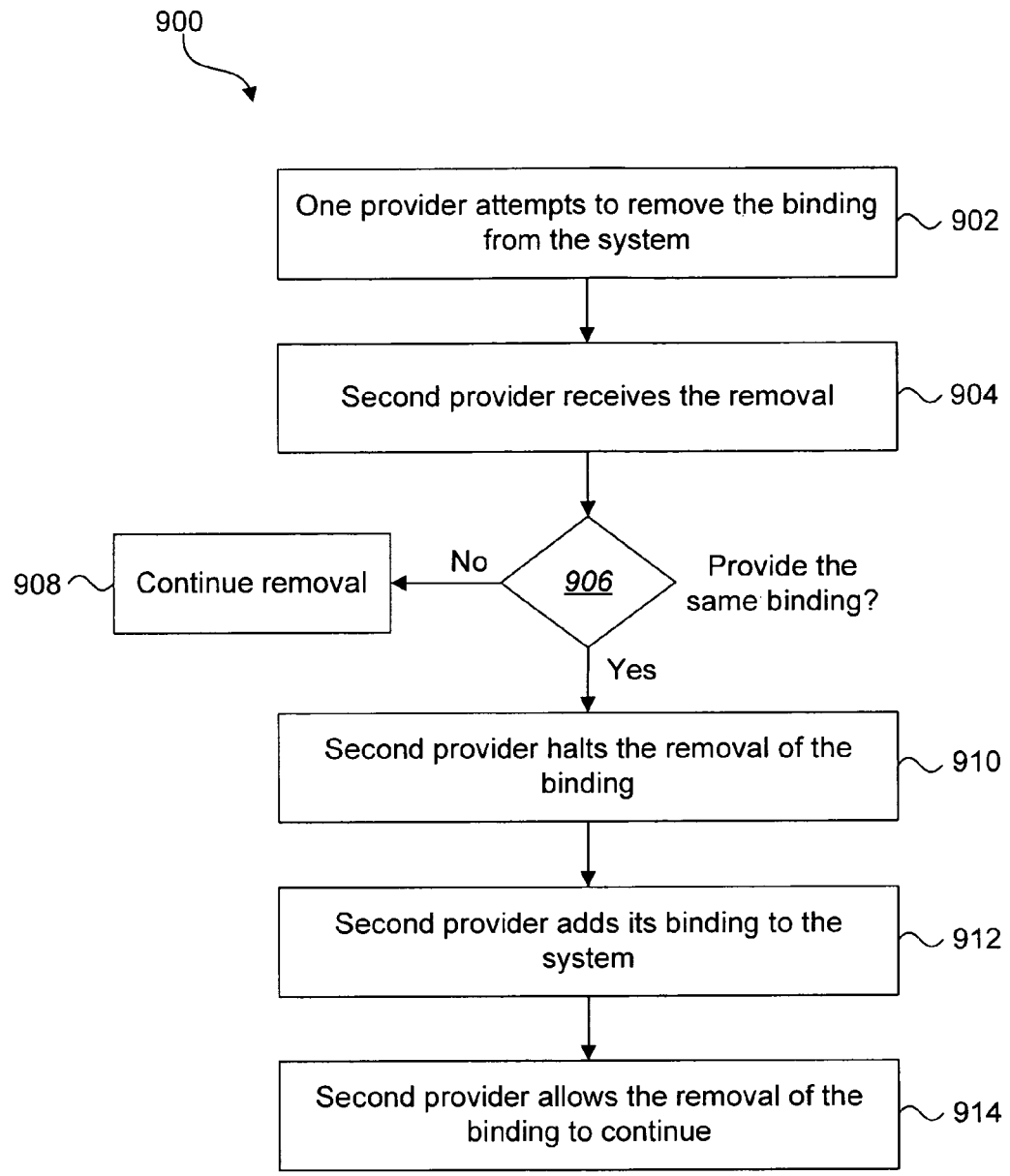
FIG. 8 is an embodiment of a method for allowing for failover from one provider to another.

FIG. 8 is an embodiment of a method 900 for allowing for failover from one provider to another. Assuming the context show in FIG. 6 and that the method of FIG. 7 has been executed such that only one provider, provider A 702a is actively providing the binding 712a. Provider A 702a attempts to remove 902 the binding 712a from the system. For example, perhaps provider A 702a is going offline or is malfunctioning and unable to continue operation. When provider B 702b receives 904 the removal, it checks to determine 906 whether it can provide the same binding. If it cannot provide the same binding, then the removal of the binding continues 908. In this situation, provider B 702b does have the first binding 712b and, as a result, it can provide the same binding (i.e., the first binding). Provider B 702b then halts 910 the removal of the first binding. Provider B 702b also adds 912 the first binding 712b to the system or network using the process described above. Provider B 702b finally allows 914 the removal of the first binding 712a to continue. Provider B 702b then begins providing the first binding 712b with its binding ID B 718b, while the first binding 712a with a binding ID A 718a is removed. This allows for failover from one provider to another.

Figure 9:
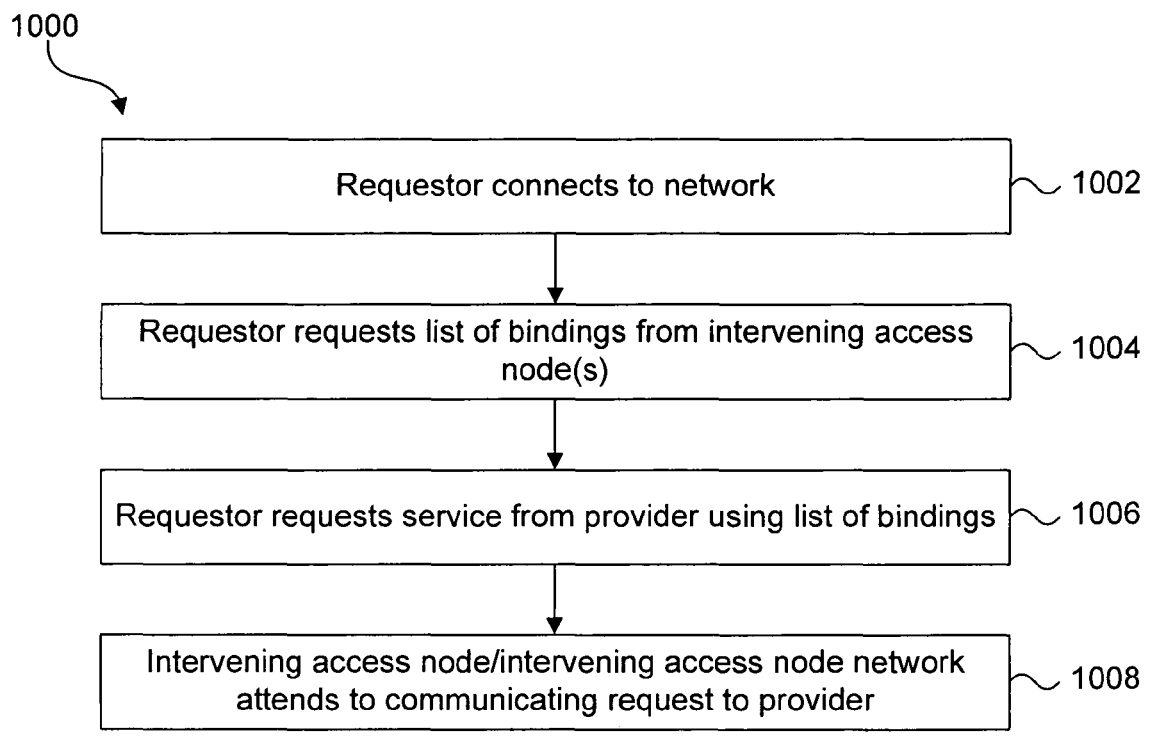
FIG. 9 is a flow diagram of an embodiment of a method of a requestor establishing a service communication link with a provider.

FIG. 9 is a flow diagram of an embodiment of a method 1000 of a requester 104 establishing a service communication link with a provider 102. The requestor 104 connects 1002 to the network 100. Then the requestor 104 may request 1004 a list of bindings from the intervening access node(s) 106. Using the list of bindings, the requestor is able to determine what service it needs and it requests 1006 the service from a provider 102. The intervening access node network 110, 210 communicates 1008 the request from the requestor 104 to the provider 102.

Figure 10:
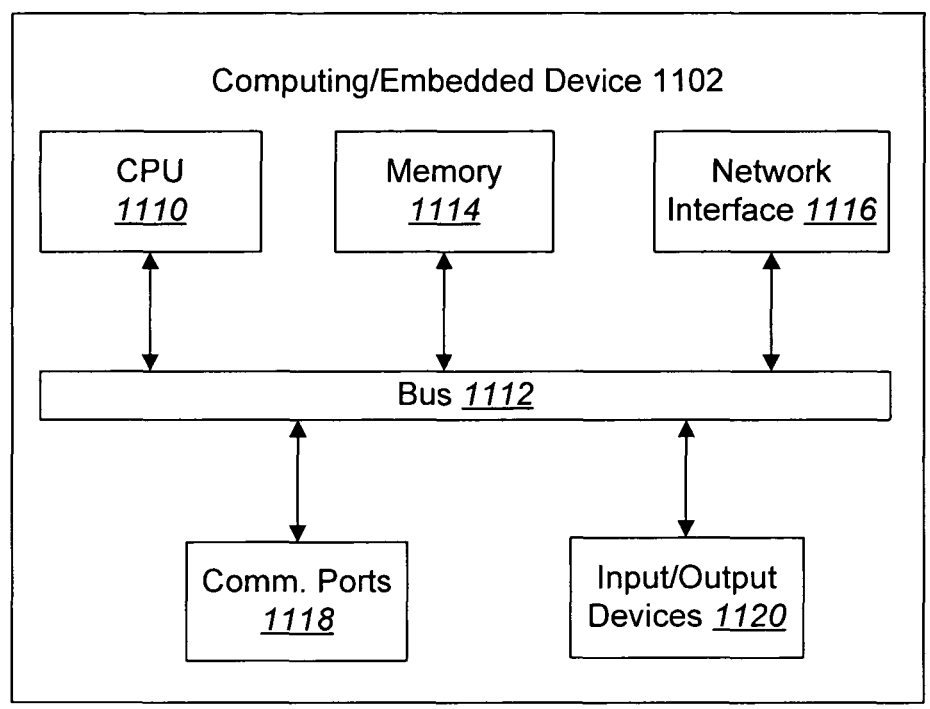
FIG. 10 is a block diagram of hardware components that may be used in an embodiment of a computing device or an embedded device.

FIG. 10 is a block diagram of hardware components that may be used in an embodiment of an embedded device which may be used as either an embedded provider or as an embedded requester.

A CPU 1110 or processor may be provided to control the operation of the embedded device 1102, including the other components thereof, which are coupled to the CPU 1110 via a bus 1112. The CPU 1110 may be embodied as a microprocessor, microcontroller, digital signal processor or other device known in the art. The CPU 1110 performs logical and arithmetic operations based on program code stored within the memory 1114. In certain embodiments, the memory 1114 may be on-board memory included with the CPU 1110. For example, microcontrollers often include a certain amount of on-board memory.

The embedded device 1102 may also include a network interface 1116. The network interface 1116 facilitates communication between the embedded device 1102 and other devices connected to the network 100. The network 100 may be a pager network, a cellular network, a global communications network, the Internet, a computer network, a telephone network, etc. The network interface 1116 operates according to standard protocols for the applicable network 100.

The embedded device 1102 may also include memory 1114. The memory 1114 may include a random access memory (RAM) for storing temporary data. Alternatively, or in addition, the memory 1114 may include a read-only memory (ROM) for storing more permanent data, such as fixed code and configuration data. The memory 1114 may also be embodied as a magnetic storage device, such as a hard disk drive. The memory 1114 may be any type of electronic device capable of storing electronic information.

The embedded device 1102 may also include communication ports 1118, which facilitate communication with other devices. The embedded device 1102 may also include input/output devices 1120, such as a keyboard, a mouse, a joystick, a touchscreen, a monitor, speakers, a printer, etc.

Figure 11:
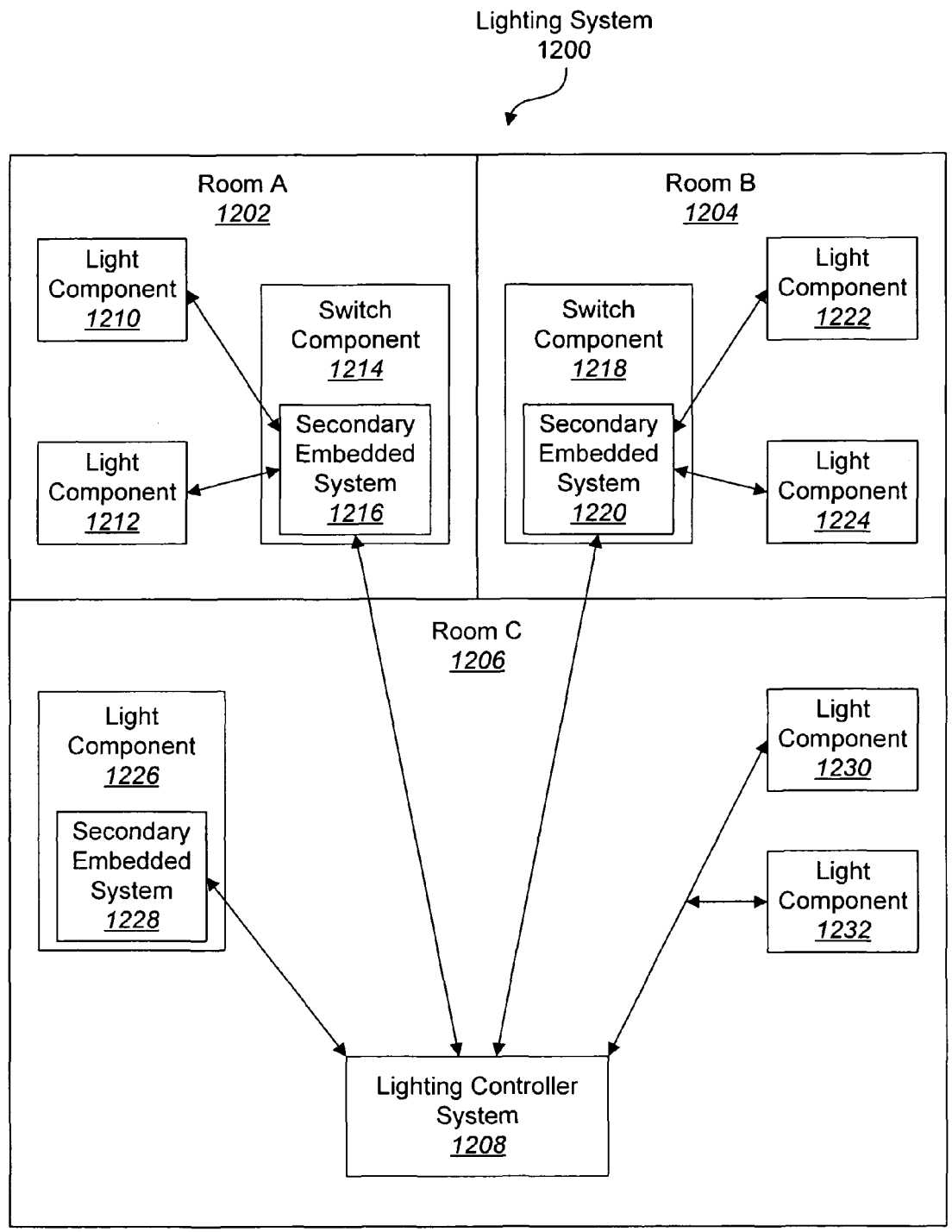
FIG. 11 is a block diagram illustrating a lighting system that may utilize the systems and methods disclosed herein.

The present systems and methods may be used in several contexts. FIG. 11 illustrates one embodiment of a system wherein the present systems and methods may be implemented. FIG. 11 is a block diagram that illustrates one embodiment of a lighting system 1200 that includes a lighting controller system 1208. The lighting system 1200 of FIG. 11 may be incorporated in various rooms in a home. As illustrated, the system 1200 includes a room A 1202, a room B 1204, and a room C 1206. Although three rooms are shown in FIG. 11, the system 1200 may be implemented in any number and variety of rooms within a home, dwelling, or other environment.

The lighting controller system 1208 may monitor and control additional embedded systems and components within the system 1200. In one embodiment, the room A 1202 and the room B 1204 each include a switch component 1214, 1218. The switch components 1214, 1218 may also include a secondary embedded system 1216, 1220. The secondary embedded systems 1216, 1220 may receive instructions from the lighting controller system 1208. The secondary embedded systems 1216, 1220 may then execute these instructions. The instructions may include powering on or powering off various light components 1210, 1212, 1222, and 1224. The instructions may also include dimming the brightness or increasing the brightness of the various light components 1210, 1212, 1222, and 1224. The instructions may further include arranging the brightness of the light components 1210, 1212, 1222, and 1224 in various patterns. The secondary embedded systems 1216, 1220 facilitate the lighting controller system 1208 to monitor and control each light component 1210, 1212, 1222, and 1224 located in the room A 1202 and the room B 1204.

The lighting controller system 1208 might also provide instructions directly to a light component 1226 that includes a secondary embedded system 1228 in the depicted room C 1206. The lighting controller system 1208 may instruct the secondary embedded system 1228 to power down or power up the individual light component 1226. Similarly, the instructions received from the lighting controller system 1208 may include dimming the brightness or increasing the brightness of the individual light component 1226.

The lighting controller system 1208 may also monitor and provide instructions directly to individual light components 1230 and 1232 within the system 1200. These instructions may include similar instructions as described previously.

Figure 12:
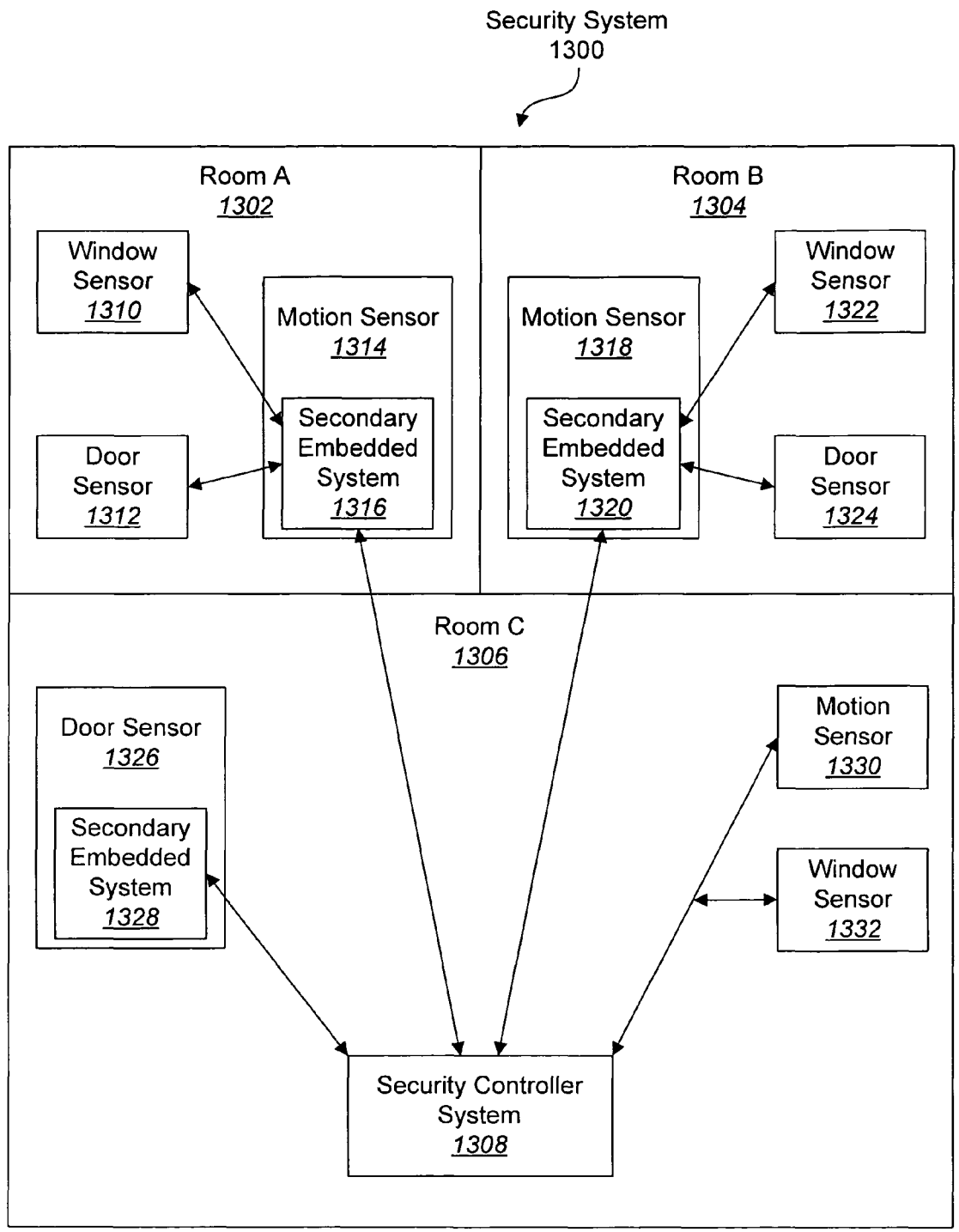
FIG. 12 is a block diagram illustrating a security system that may utilize the systems and methods disclosed herein.

FIG. 12 is an additional embodiment of a system wherein the present systems and methods of the present invention may be implemented. FIG. 12 is a block diagram illustrating a security system 1300. The security system 1300 in the depicted embodiment is implemented in a room A 1302, a room B 1304, and a room C 1306. These rooms may be in the confines of a home or other enclosed environment. The system 1300 may also be implemented in an open environment where the rooms A, B and C, 1302, 1304, and 1306 respectively represent territories or boundaries.

The system 1300 includes a security controller system 1308. The security controller system 1308 monitors and receives information from the various components within the system 1300. For example, a motion sensor 1314, 1318 may include a secondary embedded system 1316, 1320. The motion sensors 1314, 1318 may monitor an immediate space for motion and alert the security controller system 1308 when motion is detected via the secondary embedded system 1316, 1320. The security controller system 1308 may also provide instructions to the various components within the system 1300. For example, the security controller system 1308 may provide instructions to the secondary embedded systems 1316, 1320 to power up or power down a window sensor 1310, 1322 and a door sensor 1312, 1324. In one embodiment, the secondary embedded systems 1316, 1320 notify the security controller system 1308 when the window sensors 1310, 1322 detect movement of a window. Similarly, the secondary embedded systems 1316, 1320 notify the security controller system 1308 when the door sensors 1312, 1324 detect movement of a door. The secondary embedded systems 1316, 1320 may instruct the motion sensors 1314, 1318 to activate the LED (not shown) located within the motion sensors 1314, 1318.

The security controller system 1308 may also monitor and provide instructions directly to individual components within the system 1300. For example, the security controller system 1308 may monitor and provide instructions to power up or power down to a motion sensor 1330 or a window sensor 1332. The security controller system 1308 may also instruct the motion sensor 1330 and the window sensor 1332 to activate the LED (not shown) or audio alert notifications within the sensors 1330 and 1332.

Each individual component comprising the system 1300 may also include a secondary embedded system. For example, FIG. 12 illustrates a door sensor 1326 including a secondary embedded system 1328. The security controller system 1308 may monitor and provide instructions to the secondary embedded system 1328 in a similar manner as previously described.

Figure 13:
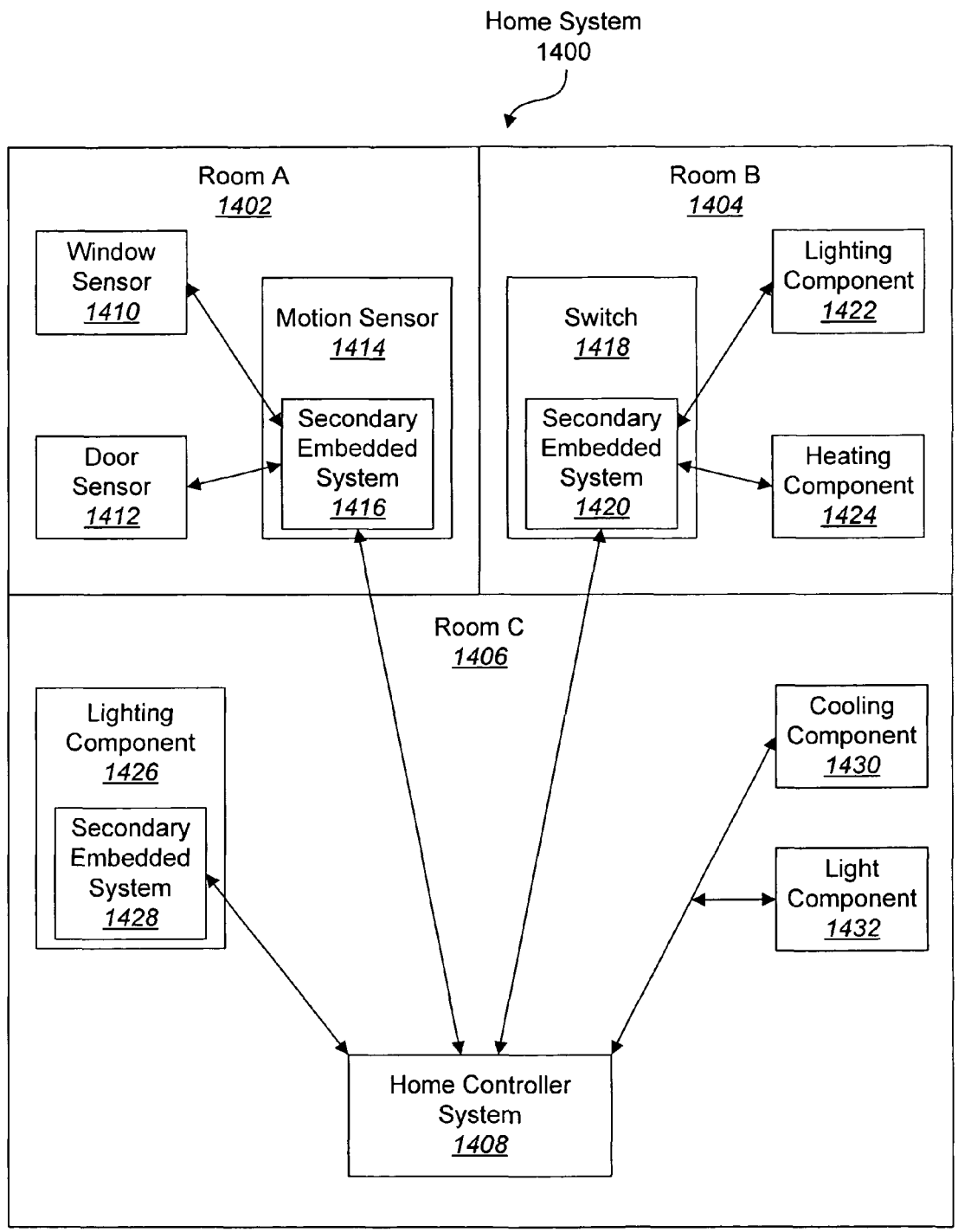
FIG. 13 is a block diagram illustrating a home system that may utilize the systems and methods disclosed herein.

FIG. 13 is a block diagram illustrating one embodiment of a home system 1400. The home system 1400 includes a home controller 1408 that facilitates the monitoring of various systems such as the lighting system 1200, the security system 1300, and the like. The home system 1400 allows a user to control various components and systems through one or more embedded systems. In one embodiment, the home controller system 1408 monitors and provides information in the same manner as previously described in relation to FIGS. 11 and 12. In the depicted embodiment, the home controller 1408 provides instructions to a heating component 1424 via a secondary embedded system 1420. The heating component 1424 may include a furnace or other heating device typically found in resident locations or offices. The home controller system 1408 may provide instructions to power up or power down the heating component 1424 via the secondary embedded system 1420.

Similarly, the home controller 1408 may monitor and provide instructions directly to a component within the home system 1400 such as a cooling component 1430. The cooling component 1430 may include an air conditioner or other cooling device typically found in resident locations or offices. The central home controller 1408 may instruct the cooling component 1430 to power up or power down depending on the temperature reading collected by the central embedded system 1408. The home system 1400 functions in a similar manner as previously described in relation to FIGS. 11 and 12.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requestor. Providers can also be set up to publish their state information to subscribers. A requestor may ask for periodic reports or for updates whenever the state changes, perhaps with some means of limiting how often updates are to be sent. Providers can be set up to notify requestors when some event or exceptional condition occurs.

Another example of a device network application is remote control, where requesters are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved, a requestor may use a web browser, pager or even a WAP-enabled cell phone to communicate with a provider in a more or less interactive manner. As the number of providers grows, however, these methods may become unworkable and requestors may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computing device that is configured for binding negotiation, the computing device comprising:
   a processor;
   memory in electronic communication with the processor storing instructions, the instructions being executable to:
   advertise a first binding with a first binding ID on a network, wherein the first binding identifies a service that is provided by the computing device;
   discover that a second provider is also providing the first binding with the same service and a second binding ID on the network by receiving a communication from the second provider;
   determine whether the communication is a duplicate of a previously-received communication by checking the second binding ID and if the communication is a duplicate, then acknowledge the communication;

determine whether the computing device is to provide the first binding by evaluating a collision function (F) using the first binding ID and the second binding ID as inputs and wherein the same rules are applied consistently when passing parameters to the collision function (F); and halt the addition of the first binding with the second binding ID or cancel the first binding with the first binding ID based on the result of the collision function so as to prevent the same service from being performed by both the computing device and the second provider, wherein the addition of the first binding with the second binding ID is halted by the computing device withholding an expected acknowledgment to the second provider, and wherein the cancellation of the first binding with the first binding ID occurs by the computing device not sending a confirmation message.

2. The computing device as defined in claim 1, wherein the first binding comprises an object and an interface.

3. The computing device as defined in claim 2, wherein a service is accessed through use of the object and the interface.

4. The computing device as defined in claim 1, wherein the collision function provides a Boolean result.

5. The computing device as defined in claim 4, wherein the collision function (F) satisfies the condition that F(A, B) is not the same as F(B, A).

6. The computing device as defined in claim 4, wherein the collision function (F) satisfies the condition that if F(A, B)=True, then F(B, A)=False.

7. The computing device as defined in claim 4, wherein the collision function (F) comprises a less than function.

8. The computing device as defined in claim 1, wherein the instructions are executable to:

receive a removal attempt from the network, wherein the removal attempt indicates that an active provider is attempting to remove a second binding on the network, and wherein the active provider is unable to continue operation;

determine whether the computing device has the ability to provide the second binding;

allow the removal attempt to continue if the computing device is not capable of providing the second binding; and halt the removal attempt and add the second binding to the network if the computing device is capable of providing the second binding but is not currently providing the second binding, wherein the removal attempt is halted until after the computing device has added the second binding.

9. The computing device as defined in claim 1, wherein the computing device is an embedded device that is part of a lighting control system.

10. The computing device as defined in claim 1, wherein the computing device is an embedded device that is part of a security system.

11. The computing device as defined in claim 1, wherein the computing device is an embedded device that is part of a home control system.

12. A method for binding negotiation between two or more providers, the method comprising:

advertising a first binding with a first binding ID on a network by a first provider, wherein the first binding identifies a service that is provided by the first provider;

discovering that a second provider is also providing the first binding with the same service and a second binding ID on the network by receiving a communication from the second provider;

determining whether the communication is a duplicate of a previously-received communication by checking the second binding ID and if the communication is a duplicate, then acknowledge the communication;

determining whether the first provider is to provide the first binding by evaluating a collision function (F) using the first binding ID and the second binding ID as inputs and wherein the same rules are applied consistently when passing parameters to the collision function (F); and halting the addition of the first binding with the second binding ID or canceling the first binding with the first binding ID based on the result of the collision function so as to prevent the same service from being performed by both the computing device and the second provider, wherein the addition of the first binding with the second binding ID is halted by the computing device withholding an expected acknowledgment to the second provider, and wherein the cancellation of the first binding with the first binding ID occurs by the computing device not sending a confirmation message.

13. The method as defined in claim 12, wherein the collision function provides a Boolean result.

14. The method as defined in claim 13, wherein the collision function (F) satisfies the condition that F(A, B) is not the same as F(B, A).

15. The method as defined in claim 13, wherein the collision function (F) satisfies the condition that if F(A, B)=True, then F(B, A)=False.

16. The method as defined in claim 12, further comprising:

receiving a removal attempt from the network, wherein the removal attempt indicates that an active provider is attempting to remove a second binding on the network, and wherein the active provider is unable to continue operation;

determining whether the first provider has the ability to provide the second binding;

allowing the removal attempt to continue if the first provider is not capable of providing the second binding; and halting the removal attempt and adding the second binding to the network if the first provider is capable of providing the second binding but is not currently providing the second binding.

17. A non-transitory computer-readable storage medium having executable instructions stored thereon, the instructions being executable to:

advertise a first binding with a first binding ID on a network by a first provider, wherein the first binding identifies a service that is provided by the first provider;

discover that a second provider is also providing the first binding with the same service and a second binding ID on the network by receiving a communication from the second provider;

determine whether the communication is a duplicate of a previously-received communication by checking the second binding ID and if the communication is a duplicate, then acknowledge the communication;

determine whether the first provider is to provide the first binding by evaluating a collision function (F) using the first binding ID and the second binding ID as inputs and wherein the same rules are applied consistently when passing parameters to the collision function (F); and halt the addition of the first binding with the second binding ID or cancel the first binding with the first binding ID based on the result of the collision function so as to prevent the same service from being performed by both the computing device and the second provider, wherein the addition of the first binding with the second binding ID is halted by the computing device withholding an expected acknowledgment to the second provider, and wherein the cancellation of the first binding with the first binding ID occurs by the computing device not sending a confirmation message.

* * * * *

UNITED STATES PATENT AND TRADEMARK OFFICE
CERTIFICATE OF CORRECTION

PATENT NO. : 8,533,255 B2
APPLICATION NO. : 11/302306
DATED : September 10, 2013
INVENTOR(S) : Bryant Eastham et al.

It is certified that error appears in the above-identified patent and that said Letters Patent is hereby corrected as shown below:

In the Specification:

In column 5, line 32 please delete "are requesters" and replace it with --are requestors--.

In column 5, line 51 please delete "two requesters" and replace it with --two requestors--.

In column 6, line 19 please delete "To requesters" and replace it with --To requestors--.

In column 7, line 36 please delete "Two requesters" and replace it with --Two requestors--.

In column 7, line 40 please delete "two requesters" and replace it with --two requestors--.

In column 7, line 46 please delete "the requesters" and replace it with --the requestors--.

In column 7, line 58 please delete "requesters 104" and replace it with --requestors 104--.

In column 10, line 31 please delete "a requester" and replace it with --a requestor--.

In column 10, lines 42–43 please delete "embedded requester" and replace it with --embedded requestor--.

In column 13, line 17 please delete "where requesters" and replace it with --where requestors--.

Signed and Sealed this
Twenty-eighth Day of January, 2014

Michelle K. Lee
*Deputy Director of the United States Patent and Trademark Office*